Nov. 6, 1945.

L. C. STURBELLE

2,388,504

LEACHING METHOD AND APPARATUS

Filed April 23, 1940

Nov. 6, 1945.  L. C. STURBELLE  2,388,504
LEACHING METHOD AND APPARATUS
Filed April 23, 1940  8 Sheets-Sheet 8

INVENTOR.
Lucien Charles Sturbelle
by Parker, Prochnow & Farmer.
ATTORNEYS.

Patented Nov. 6, 1945

2,388,504

UNITED STATES PATENT OFFICE 2,388,504

LEACHING METHOD AND APPARATUS

Lucien Charles Sturbelle, Brussels, Belgium

Application April 23, 1940, Serial No. 331,265
In Belgium April 26, 1939

21 Claims. (Cl. 23—267)

This invention relates to improved methods and apparatus for leaching comprising tanks for leaching the material to be leached, into and through which the material successively passes to be treated by a solvent, and in addition, filtration tanks, arranged in a ring, into which the pulp or material to be leached, while supported by filters, is successively passed or dipped for treatment by solvents progressively more concentrated.

An object of this invention is to provide apparatus of this kind which will be compact and easy to operate.

Another object of this invention is to provide an improved apparatus and method for leaching.

To this purpose and in accordance with this invention, the said leaching tanks are disposed along a circular arc concentric with the ring of filtration tanks.

In the case in which the material or pulp must be treated successively by different solvents in an installation including in each treatment, first, tanks to leach the material to be leached and through which the material or pulp passes in succession for treatment by a solvent, and secondly, filtration tanks, this invention provides a particularly advantageous arrangement of the leaching and filtration tanks. To this effect the filtration tanks used in each treatment are arranged in a ring, whereas the leaching tanks are disposed along an arc of a circle concentric with the rings formed by the filtration tanks used in the different treatments.

In case the filtrate from the filtration tanks is drawn or sucked into a vacuum tank, it is advantageous to locate the filtration tanks and the vacuum tanks above the leaching tanks.

By means of this arrangement, the discharge of the filtrate from a vacuum tank into a receiving tank, which is at a lower level, can be accomplished without the use of pumps if the height of the column of liquid between the vacuum tank and the receiving tank into which the filtrate must be discharged is higher than the vacuum column created in the vacuum tank.

When the height of this column is insufficient, one can nevertheless dispense with pumps by connecting each vacuum tank alternatively to a source of vacuum and to the atmosphere.

In order to insure a continuous circulation of liquid in spite of the intermittent connection of the vacuum tanks to a vacuum source and to the atmosphere, in accordance with this invention a pair of vacuum tanks is connected in parallel to each filtration tank by means of two conduits, each conduit having a check or aspiration valve, and said vacuum tanks are also connected to the receiving tank or receptacle into which the filtrate must pass by means of two other conduits each provided with a check or flow valve. Each pair of vacuum tanks is constructed in such a manner that one of them can be connected to the source of vacuum while the other one is open to the atmosphere.

When using a pair of vacuum tanks with each filtration tank, one can automatically realize a convenient connection of all these vacuum tanks by the following construction and arrangement: an annular conduit is placed in communication with one of the vacuum tanks of each pair associated with a filtration tank, whereas another annular conduit is placed in communication with the other vacuum tanks of each pair. These two annular conduits are also connected to a distributor, which simultaneously places one of these conduits in communication with a source of vacuum and the other in communication with the atmosphere and vice versa.

Another advantage of this apparatus follows from the use of filter elements answering the following description. Filtration is accomplished in the filtration tanks by the passage of solution through filter elements having vertical axes. The filter elements are carried by movable supports, which can be raised in such a manner as to remove the elements from the filtration tanks. The said supports are also mounted for lateral or rotary movement which enables them to pass above each of the filtration tanks.

The filter elements are preferably carried by radial arms fastened to a vertical shaft concentric with the rings of filtration tanks, these arms being capable of upward movement in order to remove or withdraw the filter elements from the filtration tanks, and the said shaft also being mounted for rotation for the purpose of guiding the arms successively over different filtration tanks.

In the event that the apparatus comprises pulp thickeners, one may also advantageously arrange the latter as follows: the pulp thickeners are disposed one above the other along the axis of the ring of leaching tanks, and preferably within that ring.

Other advantages and details of the invention will appear from the following description and annexed drawings which show schematically, by way of one example, an embodiment of this invention.

In the different figures, the same numerals and reference characters designate the same parts.

Figure 1:
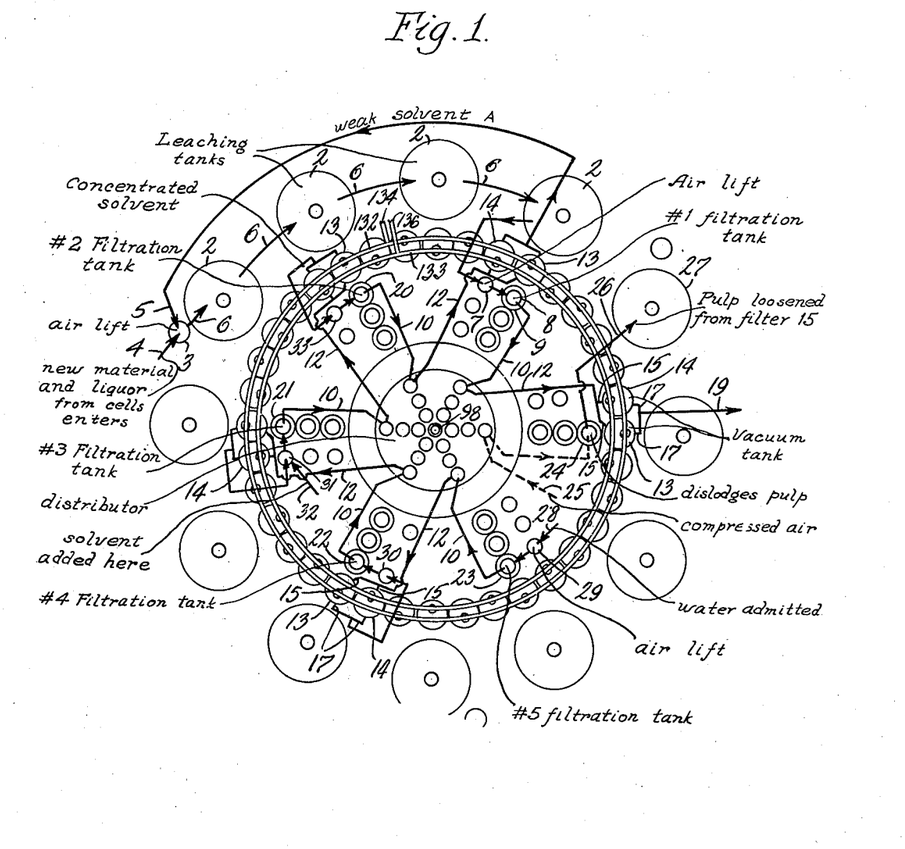
Fig. 1 is a schematic plan view of apparatus constructed in accordance with this invention, in which only the processing of the material while undergoing a first treatment has been indicated.

Referring now to Fig. 1, this drawing represents an apparatus having leaching or mixing tanks, four of which are marked 2. The pulp or material to be leached passes successively through each of these tanks while being subjected to the action of a solvent which will hereinafter be designated as solvent A. The raw material is introduced into the air lift 3, as indicated by the arrow 4, at the same time as the solvent A, as indicated by the arrow 5. The concentration of this solvent is relatively weak, as will be understood when its origin is hereinafter explained. The mixture of the material to be leached and the solvent passes successively into the different leaching tanks 2, following the path indicated by the arrow 6. Suitable conveying means, such as air lifts (not shown) may be used to transfer the material from one tank to the next. In the fourth leaching tank 2 the solvent is assumed to be exhausted or very weak, and the material to be leached is carried by means of an air lift 7 into a filtration tank 8. In the latter is a filter element in the form of a cylinder 9 having a vertical axis. The interior of this cylinder is connected by a hose 10 to a distributor 11, and said distributor is connected by a hose 12 to a pair of vacuum tanks 13 and 14, one of which is under vacuum while the other is open to the atmosphere and vice versa.

Figure 4:
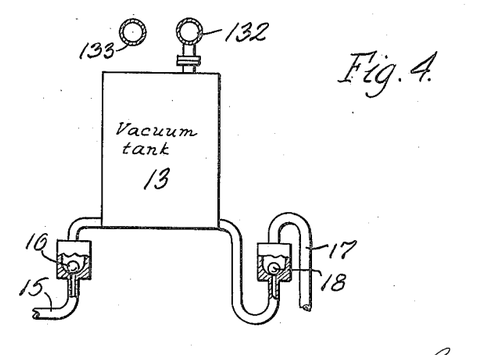
Fig. 4 is an elevation of a vacuum tank together with the two pipes which are connected thereto.

The communication between the hose 12 and the vacuum tanks 13 and 14 is accomplished by means of two conduits 15, each having, as shown particularly in Fig. 4, a suction or aspiration valve 16. The two tanks 13 and 14 are also connected by two conduits 17 (Fig. 1), each of which has a flow or check valve 18 (Fig. 4), to a conduit 19 serving to discharge the exhausted or weakened solution.

The means by which one of the tanks 13 and 14 is placed under vacuum while the other is open to the atmosphere will be hereinafter explained. With the aid of the valves 16 and 18 the filtrate can be continuously drawn through the filter element 9. Assuming that the vacuum tank 13 is under vacuum, the suction valve 16 in the conduit 15, which is connected to this vacuum tank, will let the filtrate pass, whereas the flow valve 18 in the conduit 17, which also connects with this vacuum tank, will remain closed. On the other hand, if at the same time that the vacuum tank 14 is opened to the atmosphere it contains some liquid, the latter will flow downwardly and out through the conduit 17 after having forced open the valve 18, whereas the corresponding suction valve remains closed.

The material or pulp which has been retained by the filter element sticks to the outside of the filter element in the form of a tube or coating. Therefore, when one removes the filter element from the filtration tank, the pulp or material is removed therewith at the same time.

The removal of the filter element 9 is accomplished by lifting it up with the aid of mechanism which will be hereinafter described. After lifting up the filter element 9, it is guided or conducted into a position above a filtration tank 20 and is lowered into that tank. When it is in place therein, the tube of material to be leached is treated by a more concentrated solvent than that which was circulated through the material in the filtration tank 8.

After treatment in the tank 20, the filter element and the material which sticks to it are lifted up and removed therefrom, and conducted in an analogous manner to that just described into a filtration tank 21. In the latter even more concentrated solvent is passed through the material. The filter element is then similarly guided into a tank 22 where the material is washed by a very dilute solution of the solvent in water. Then the filter element is guided into a filtration tank 23 where the material is washed with pure water.

Finally the filter element is conducted to a position above a hole 24. Then compressed air, following the path indicated by the arrow 25, is introduced into the center of the filter element. The material is loosened and detached from the filter element by the pressure of the compressed air exerted on or admitted to the interior of said element. This material is then conveyed through a passage indicated by the arrow 26 into a leaching tank 27, where it begins to undergo treatment by another solvent. This treatment will be later explained with reference to Fig. 2. The pure water which serves to clean the material in the filtration tank 23 is introduced as indicated by the arrow 28 into an air lift 29. In passing through the material on the filter element in the tank 23, the water absorbs or entrains part of the solvent. The dilute solution of the solvent thus obtained is drawn or sucked from the center of the filter element into the filtration tank 23 along the path indicated by the arrows 10 and 12, which represent at the same time the hose communicating with the distributor 11, such hose being similar to the hose 10 and 12 which were above mentioned.

The hose 12 is connected to two vacuum chambers 13 and 14 similar to the chambers 13 and 14 above described. This connection is also established by means of conduits such as 15 and 17. The one of the two vacuum chambers which is in communication with the atmosphere empties, under the action of gravity, into an air lift 30. The latter forces the dilute solution into the filtration tank 22. This solution passes through the material or pulp and entrains a new quantity of solvent. The solution, now a little more concentrated, passes through other hose 10 and 12 and another pair of vacuum chambers 13 and 14, and is introduced into an air lift 31 at the same time that concentrated solvent is also introduced therein as indicated by the arrow 32. The relatively concentrated solution which is thus formed in the air lift circulates about the material to be leached in the filtration tank 21. The solution leaving this tank is therefore more concentrated than the solution from tank 22. The solution is then conducted into an air lift 33 which introduces it into the filtration tank 20, where it once again loses a little of its concentration. On leaving the tank 20 the solvent solution passes through hose 10 and 12, vacuum chambers 13 and 14, and is conducted by the conduit 5 into the air lift 3 where it is placed in contact with the raw material to be treated.

From the above description it is seen that the various filtration tanks used in the treatment are arranged in a ring, and that the material to be leached enters each of those filtration tanks successively while carried by a filter element which may be raised above the filtration tanks, then conducted to a position above an adjacent tank and finally lowered into the latter tank.

It is noteworthy that the filter element which leaves its position above the hole 24 is then reintroduced quite clean into the filtration tank 8, which receives the matter to be leached from the last leaching tank 2.

Of course the apparatus comprises as many filter elements as there are filtration tanks, and these elements are moved simultaneously in the same manner.

It goes without saying that when the installation is set up for normal operation, all these filter elements are used simultaneously in the different filtration tanks, and the solvent and water used to clean the material circulate approximately continuously from one filtration tank to the other in the opposite direction from the direction of movement of the filter elements.

Figure 2:
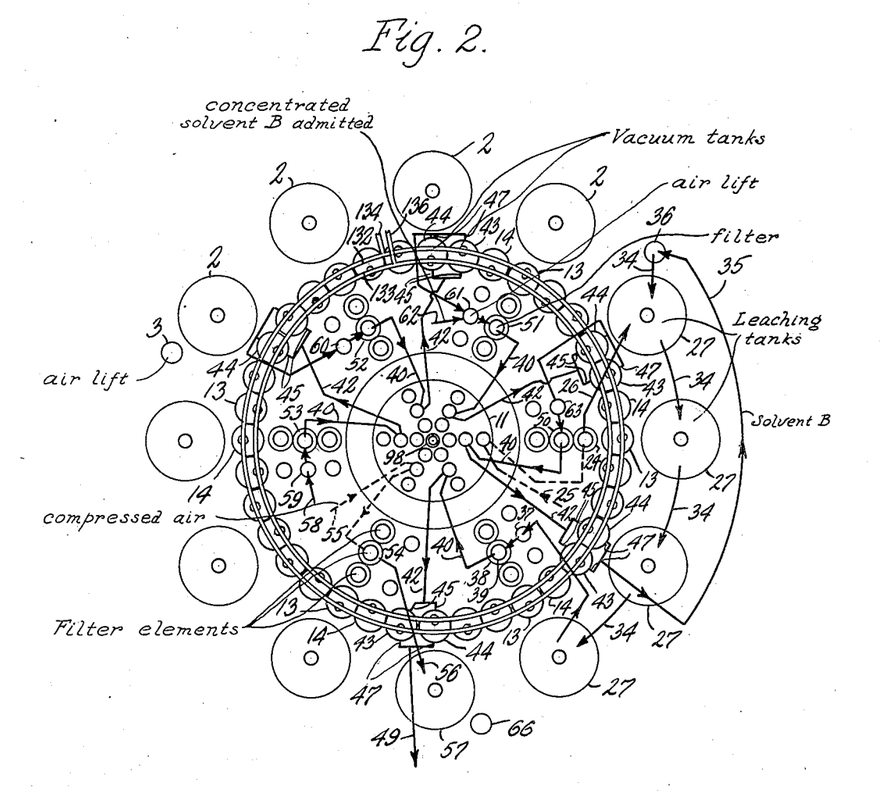
Figs. 2 and 3 show in a similar manner the same apparatus, in which only the processing of the matter while undergoing a second and a third treatment respectively has been indicated.

Referring now to Fig. 2, one can see that the pulp or material introduced into the first leaching tank 27 passes successively, as indicated by the arrows 34, into three other similar leaching tanks. In these leaching tanks the material is subjected to the action of a second solvent hereinafter designated as solvent B, which is conducted by a conduit 35 into an air lift 36. The latter introduces this second solvent into the first leaching tank 27 following the path indicated by one of the arrows 34. On leaving the fourth leaching tank 27, the solvent which is assumed to then be neutralized and the material to be leached pass into an air lift 37, which introduces them into the filtration tank 38. In the latter is a filter element 39. The solvent is drawn or sucked into the interior of this filter element, whereas the material to be leached remains stuck against it. The filtrate follows the path indicated by the hose 40 and 42. A pair of vacuum tanks 43 and 44 play the same role as the vacuum tanks 13 and 14 of Fig. 1. One of these vacuum tanks is under vacuum while the other is in communication with the atmosphere. The conduits 45 and 47, similar to conduits 15 and 17 of Fig. 1, connect these two vacuum tanks in parallel. The filter element 39 in the filtration tank 38 is guided or conducted, after extraction of the filtrate from this tank, into a tank 50, then successively into the tanks 51, 52, and 53. The circulation of liquid in these tanks is effected in a manner similar to that above explained in connection with the filtration tanks 20 to 23 of Fig. 1. All the reference characters between 37 and 63 designate elements similar to those which have been designated respectively 7 to 33 in Fig. 1. The concentrated solvent B is introduced into the air lift 61 as indicated by arrow 62. The dilute solution of solvent, obtained by washing the material or pulp in the filtration tanks 52 and 53, is also introduced into this air lift 61. After washing, the material is detached from the filter element above the hole 54 by the action of compressed air introduced as indicated by arrow 55. This material is conducted by a passage, following the path indicated by arrow 56, into a leaching tank 57, where it begins to undergo a new treatment hereinafter described in connection with Fig. 3.

Figure 3:
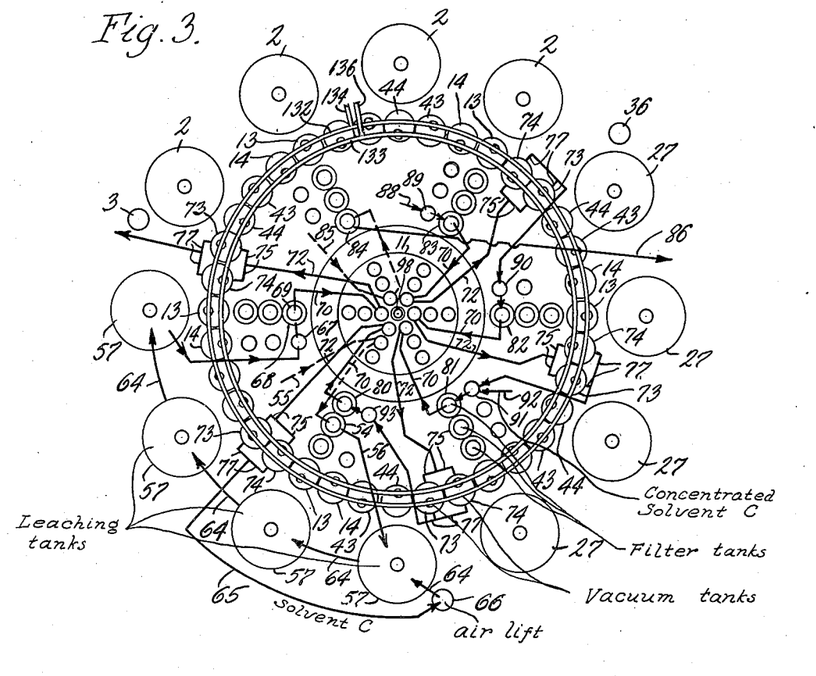

Referring now to Fig. 3 one sees that the material or pulp introduced into the first leaching tank 57 passes successively, along the path indicated by arrows 64, into three other similar leaching tanks. In these tanks the material is subjected to the action of a third solvent hereinafter designated solvent C, which is introduced by a conduit 65 into an air lift 66. This last mentioned air lift introduces this third solvent into the first of the leaching tanks 57, following the path indicated by the arrows 64. On leaving the fourth leaching tank 57, the solvent now assumed to be neutralized and the material or pulp pass through an air lift 67, which introduces them into a filtration tank 68. In the latter is a filter element 69. The solvent is drawn or sucked into the interior of this filter element, but the material or pulp remains stuck to the outside of the element. The filtrate follows the path indicated by the hose 70 and 72. A pair of vacuum tanks 73 and 74 plays the same role as the vacuum tanks 13 and 14 of Fig. 1. One of the pair of vacuum tanks is under vacuum while the other is open to the atmosphere. Conduits 75 and 77, similar to the conduits 15 and 17 of Fig. 1, connect these two vacuum tanks in parallel. The filter element 69 in the filtration tank 68 is guided or conducted, after extraction of the filtrate from this tank, into a filtration tank 80, then successively into the tanks 81, 82 and 83. The circulation of the liquid in these tanks is effected in a manner similar to that above explained in connection with the tanks 20 to 23 of Fig. 1.

All the reference characters between the numbers 67 and 93 designate respectively elements similar to those which have been designated by numbers 7 to 33 in Fig. 1.

The concentrated solvent C is introduced into the air lift 91 as indicated by arrow 92. The dilute solution of solvent, obtained by washing the material to be leached in the filtration tanks 82 and 83, is also introduced into the air lift 91. After washing, the material is detached from the filter element above the hole 84 by the action of compressed air introduced as indicated by arrow 85. This material, which has been completely leached, is thereafter discharged through a passage following the path indicated by the arrow 86. As seen by inspection of Figs. 2 and 3, the filtration tanks in which one accomplishes the second treatment and the third treatment of the pulp or material to be leached are disposed for each treatment in rings concentric with the ring of filtration tanks in which the first treatment is effected. Of course in the second and third treatments as well as in the first, several filter elements, equal in number to the number of filtration tanks are used. The whole scheme of treatment to which the pulp or material is subjected from its entrance into the apparatus indicated by arrow 4 of Fig. 1 to its discharge as indicated by the arrow 86 of Fig. 3 results in a superposition of the various paths and circuits shown in Figs. 1 to 3. It is only for the sake of simplicity and convenience that we have shown the paths and circuits relating to each treatment in a separate figure.

One should also note with reference to Figs. 1 to 3 that the leaching tanks are arranged in a ring concentric with the rings formed by the filtration tanks used in the different treatments.

Figure 5:
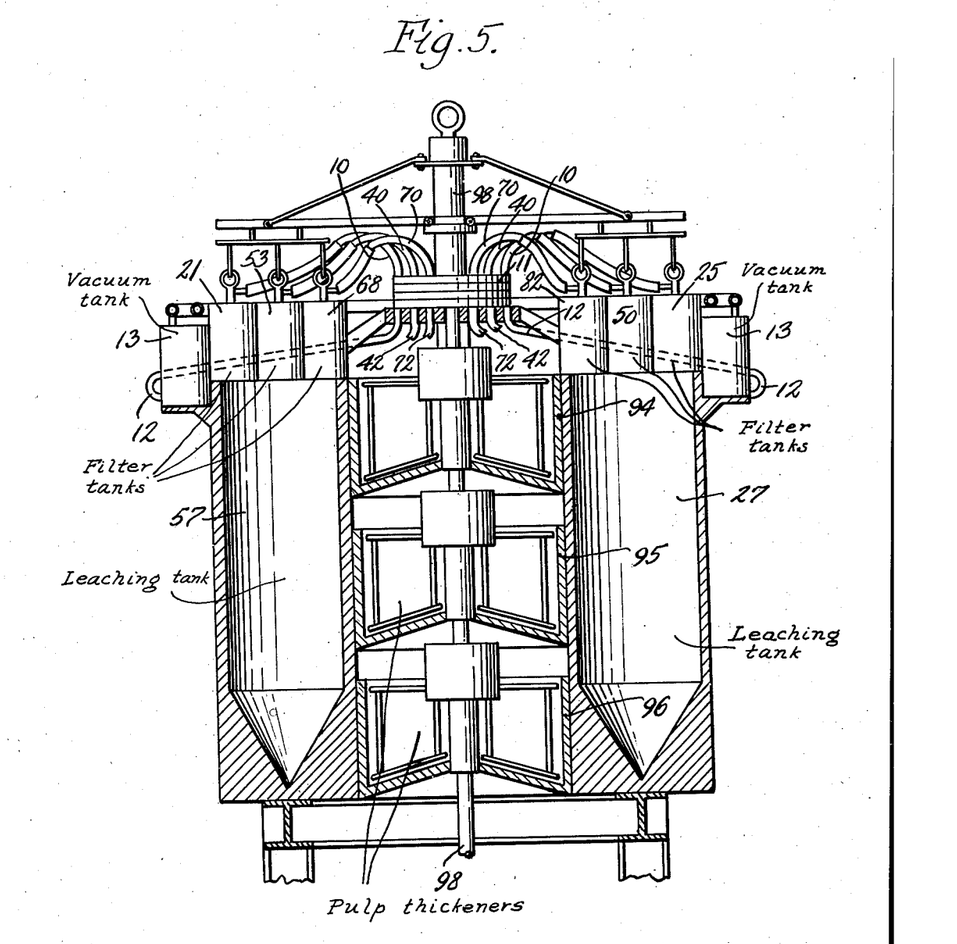
Fig. 5 is a vertical section of apparatus constructed in accordance with this invention.

Fig. 5 shows schematically a vertical sectional elevation of an apparatus constructed in accordance with the invention. The vacuum chambers such as the chambers 13, 14, 43, 44, 73 and 74 of Figs. 1 to 3 are so arranged that the three rings of filtration tanks are above the leaching tanks.

Due to the fact that the filtration tanks and the vacuum tanks are disposed approximately at the same level, the vacuum provided in the vacuum tanks may be limited to that which is strictly necessary to force the passage of the filtrate through the filter elements, that is, to suck the solution through the filter walls and various conduits leading to the vacuum tanks. In addition, opening the vacuum tanks 14, 44 and 74 to the atmosphere while the tanks 13, 43 and 73 are under vacuum allows the liquid in the vacuum tanks in communication with the atmosphere to flow out freely under the forces of gravity into the receptacles or receiving tanks located beneath them. Such receptacle in a proper case may be a leaching tank, or a part of an air lift, or a wholly separate tank into which the material leaving the apparatus is discharged.

If the vertical distance between the vacuum tanks and the receptacles or receiving tanks into which the filtrate must be discharged were at least equal to the height of the vacuum column, this discharge could be effected directly from the vacuum tanks while the latter are under vacuum.

If the material which has been treated in the leaching tanks must pass into a pulp thickener before being introduced into the filtration tanks, such pulp thickener may advantageously be disposed within the ring of leaching tanks.

Fig. 5 shows three superposed pulp thickeners designated respectively 94, 95 and 96. One of each of these pulp thickeners is operable to thicken the material leaving the leaching tanks associated with one of the three treatments which the material or pulp successively undergoes. The passage of the mixture from the last leaching tank of each treatment into the corresponding pulp thickener is effected, for example, by means of an air lift not shown.

The filter elements are carried by radial arms 97 (Figs. 5 and 6) fastened to a shaft 98 concentric with the rings of filtration tanks. This shaft is vertically movable to an extent sufficient to remove or lift the filter elements from the filtration tanks. This lifting is, for example, effected by the following means. A motor 99 (Fig. 7) drives, by means of a speed changing mechanism 100, a shaft 101 (Figs. 7 and 8) upon which is fastened a cylinder having an electrically conducting zone 102 and a non-conducting portion 103. Three brushes 104, 105 and 106 contact the cylinder. These brushes are connected respectively to the windings 107, 108 and 109 of a motor connected with star windings. These three windings are electrically connected at the center of the star when the brushes 104, 105 and 106 are in contact with the conducting zone 102 of the cylinder. Assuming that this contact exists, the motor 99 rotates and drives the shaft 101. A movable plate of a distributor 110 is rotatably secured to this shaft 101, Figs. 7, 8 and 9, said distributor also having a stationary plate to which are connected three conduits 111, 112 and 113. The conduit 111 communicates with a source of compressed air, whereas the conduit 112 communicates with a sealed reservoir 114 (Fig. 7) which in turn communicates with a cylinder 115. Liquid 116 is contained in the reservoir 114 and is in contact, in the cylinder 115, with a liquid-tight piston 117. The piston rod 118 supports the shaft 98 which can be rotated by the shaft 101 by means of a mechanism which will be later described. The distributor 110 (Figs. 8 and 9) has a movable plate 119, in which is a groove 120. This plate is fastened to the shaft 101 and is supported by that shaft in such a position that at the precise moment when the conduit 112 is placed in communication with the conduit 111 through the groove 120 the insulated portion 103 comes into contact with the three brushes 104, 105 and 106. At that moment the source of motor current is interrupted, since the three windings 107, 108 and 109 are no longer electrically connected at the center of the star. Due to this the motor 99 stops, but the compressed air continues to pass through the conduit 112 and pushes the piston 117 upwardly to lift the shaft 98. This shaft is raised to such an extent that the filter elements are completely removed and withdrawn from the filtration tanks. It should be noted that the hose 10, 40, and 70, which connect the distributor to the various filter elements, will be inclined downwardly toward the distributor 11 when the filter elements are in raised position, so that any liquid remaining therein when the vacuum is cut off will flow towards the distributor under the influence of gravity alone.

At the end of the lifting movement of the shaft 98, this shaft reestablishes the contacts supplying current to the motor. To this effect the shaft 98 has secured thereto a collar or ring 121 (Figs. 7 and 10), which, at the moment when the filter elements have been completely removed from the filtration tanks, guides the electrically conducting arms 122, 123 and 124, connected respectively to the brushes 104, 105 and 106, into contact with the housing 125 which is also made of a conducting material. At that time, since the source of current feeding the motor 99 is again connected thereto, the shaft 101 begins to rotate again. A plate 126 provided with a pin 127 (Figs. 10 and 11) is also secured to the shaft 101 so as to revolve therewith, and the said pin serves to drive the wheel 127 of a star wheel or Maltese cross mechanism. The plate 126 is fastened to the shaft 101 in a manner such that the raising of the shaft 98 due to passage of compressed air from the conduit 111 into the conduit 112 takes place at the moment when the pin 127 starts to drive the star wheel, and consequently, when the motor 99 begins once again to turn after the lifting of the shaft 98, the star wheel is thereupon immediately driven. The star wheel is secured to and rotatable with a shaft 129, which carries a toothed wheel or gear 130. The latter meshes with another toothed wheel or gear 131 splined to the shaft 98. Thus the shaft 98 is revolved. The gears 130 and 131 are so assembled that they can easily be replaced by others. The relative size of their diameters is determined by reference to the angle of rotation through which the Maltese cross or star wheel 128 turns each time that it is driven by the pin 127 and with reference to the angle of rotation through which the arms supporting the filter elements must turn in order to pass from one filtration tank to the next tank following.

Figure 9:
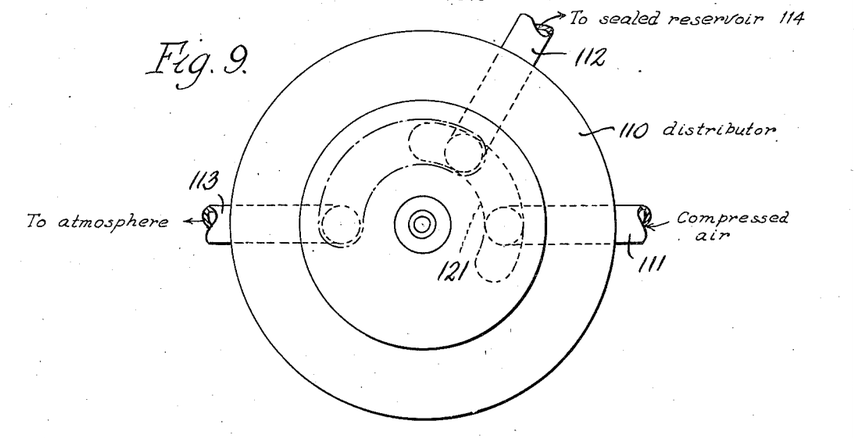
Fig. 9 is a plan view of the mechanism shown in Fig. 8.

When the star wheel 128 ceases to be driven by the pin 127, the groove 121 has been guided into a position such as shown in dot and dash in Fig. 9, in which position the conduit 112 communicates with the conduit 113 which opens into the atmosphere. Consequently at this moment the compressed air above the liquid 116 in the reservoir 114 can escape freely, and the shaft 98 can descend under its own weight into the position that it occupied before being lifted. During the descent of the shaft 98 the filter elements drop into the filtration tanks over which they have just been guided. While the star wheel 128 is being driven by the pin 127, the insulated portion 103 is turned with respect to the brushes 104, 105 and 106 so as to no longer be in contact with those brushes. Thus at the moment when the groove 121 reaches the position shown in dot and dash lines of Fig. 9, the feeding of current to the motor 99 is also assured by the contact of the brushes 104, 105 and 106 with the conducting zone 102. Therefore the current to the motor is not interrupted when the collar 121, in descending with the shaft 98, breaks the contacts between the conducting arms 122, 123 and 124 and the housing 125.

Each of the hose 12, 42 or 72 shown in Figs. 1 to 3 is connected respectively by means of conduits 15, 45 or 75 to a pair of vacuum tanks 13—14, 43—44 or 73—74. The vacuum tanks 13, 43 and 73 are simultaneously placed under vacuum, when the tanks 14, 44 and 74 are simultaneously put in communication with the atmosphere and vice versa. These connections are established in view of the fact that all the vacuum chambers 13, 43 and 73 are in communication with an annular conduit 132 (Figs. 1 to 3), whereas all the tanks 14, 44 and 74 are in communication with another annular conduit 133. The annular conduit 132 is connected by a conduit 134 (Figs. 1, 2, 3 and 12) with a distributor 135, shown in more detail in Fig. 12.

The annular conduit 133 communicates with the same distributor through a conduit 136. Two other conduits also connect with this distributor, one of which conduits 137 is in communication with a source of vacuum while the other conduit 138 is in communication with the atmosphere. This distributor comprises a rotatable plate, which differs from the plate 119 of Fig. 8 in that instead of having a groove such as the groove 120 of the last mentioned plate it has two grooves 139 and 140 similar to the above mentioned groove 120.

Figure 12:
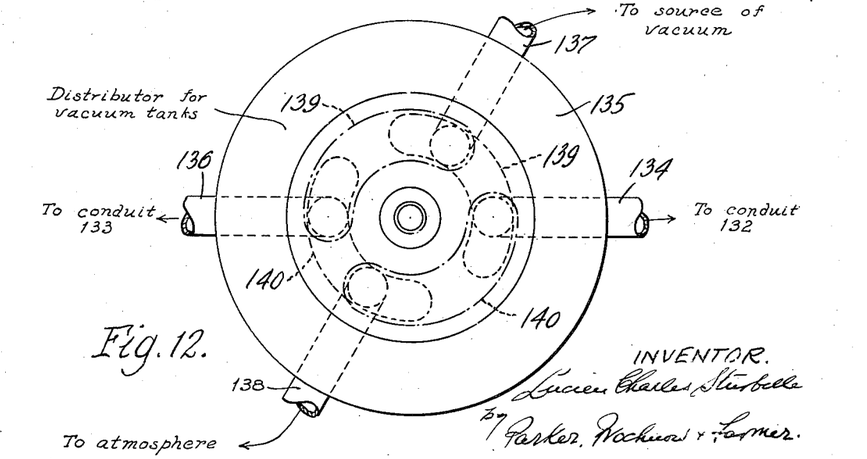
Fig. 12 is a plan view of a distributor automatically operable to place half of the vacuum chambers in communication with the source of vacuum and the other half of those chambers in communication with the atmosphere.

Assuming that the two grooves 139 and 140 occupy the positions shown in dotted lines in Fig. 12, all of the vacuum tanks 13, 43 and 73 are under vacuum, since the communication of the conduit 137 with the annular conduit 132 is established by means of the groove 139 and the conduit 134.

At the same time all the vacuum tanks 14, 44 and 74 communicate with the atmosphere, as the conduit 138 is in communication with the annular conduit 133 through the conduit 140 and the conduit 136.

Assuming that the plate having the grooves 139 and 140 is rotated to an extent such that the grooves have been guided into the position shown in dot and dash lines in Fig. 12, then the annular conduit 133 is placed in communication with the conduit 137 which connects with the source of vacuum, and the annular conduit 132 is placed in communication with the atmosphere through the conduit 138.

Figure 7:
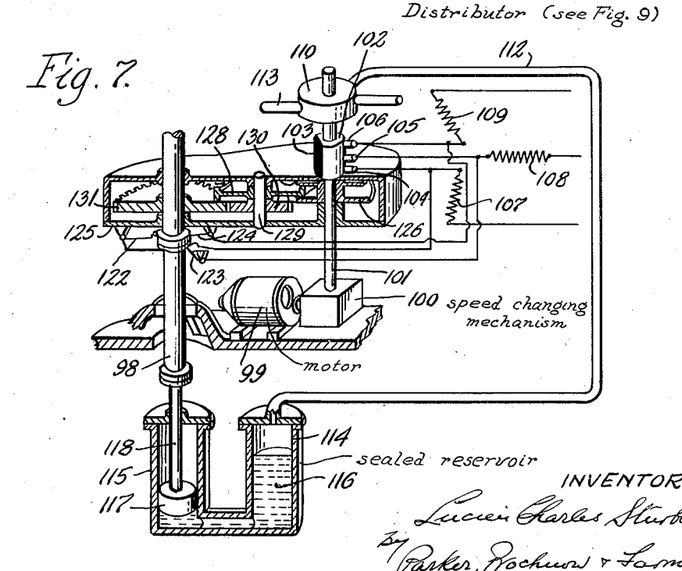
Fig. 7 is a schematic diagram of the shaft control mechanism, which operates to remove the filter elements from one filtration tank and place them in an adjacent tank.
Figure 8:
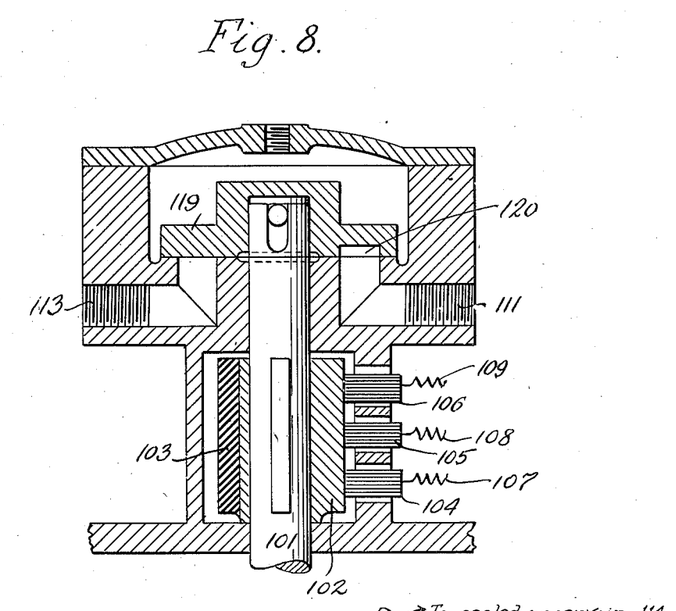
Fig. 8 is a vertical section of a part of the control mechanism.
Figure 10:
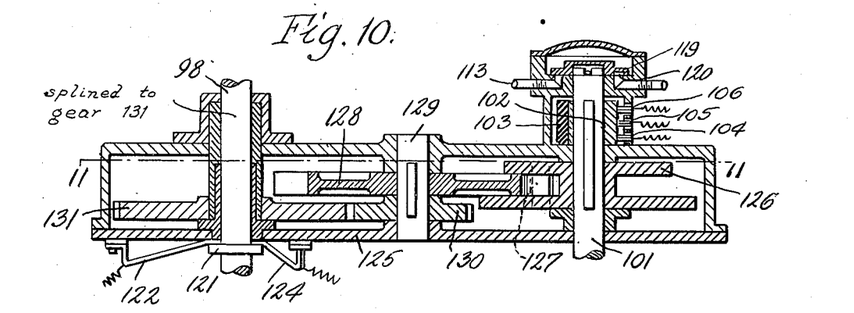
Fig. 10, on a smaller scale, is a vertical sectional elevation of the same part of the mechanism as shown in Fig. 8, as well as some of the adjacent parts of the apparatus, this section being taken along the line 10—10 of Fig. 11.
Figure 11:
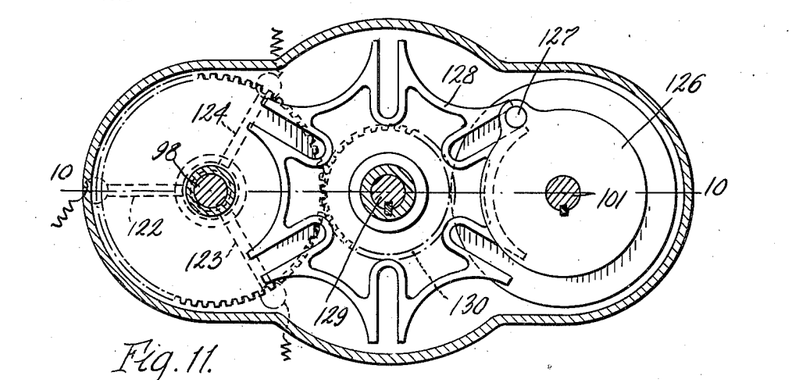
Fig. 11 is a transverse section taken along the line 11—11 of Fig. 10.

The rotatable plate of the distributor 135 may be driven in any suitable manner, and in a preferred form of the invention it may be secured on the shaft 129 or an extension thereof projecting above the housing 125 (Figs. 7 and 10). It might also be rotatably secured to the shaft 98 for rotation therewith, but in the illustrated embodiment, the shaft 98 rotates at a much slower rate than the shaft 129 and therefore would be somewhat less satisfactory.

Figure 6:
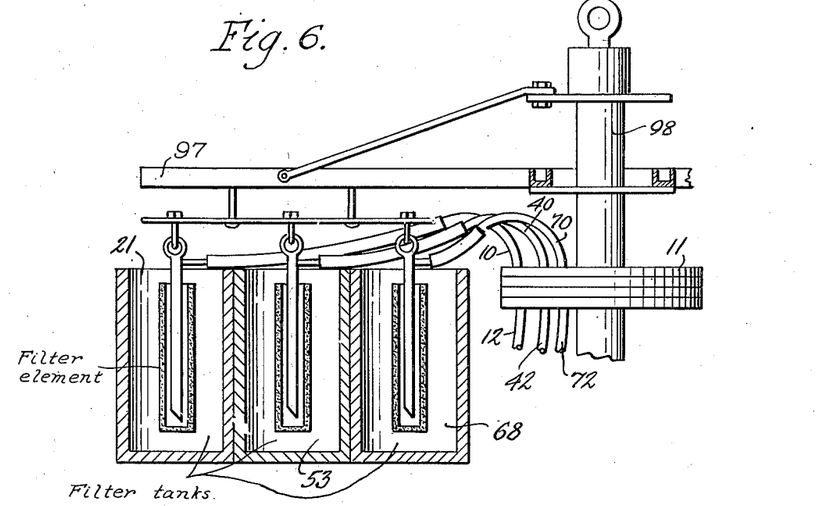
Fig. 6 is a vertical section of the upper half of the apparatus shown in Fig. 5.

The shaft 98, to which are fastened the radial arms 97, also operates and controls by its rotation the distributor 11 which has heretofore been mentioned. This distributor comprises a movable plate 141 (Figs. 13 and 14) having a ring of passages 142, a ring of passages 143 and a ring of passages 144. That is to say, as many rings of passages as there are rings of filtration tanks. This movable plate is mounted in contact with a fixed plate 145 in which are disposed passages 146, 147 and 148, these latter passages being face to face in communication with the passages 142, 143 and 144 of the movable plate when the filter elements are in filtration tanks or directly above them. The passages in the movable plate 141 are connected by hose 10, 40 and 70 to the interior of the filter elements, as shown in Fig. 6. The passages in the fixed plate 145 are connected by hose 12, 42 and 72 to the pairs of vacuum tanks 13—14, 43—44 and 73—74.

Figure 13:
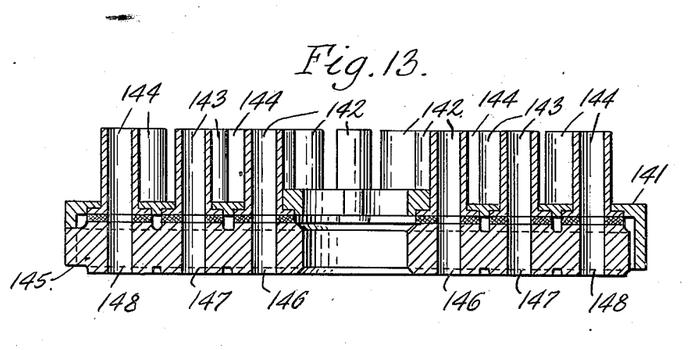
Fig. 13 is a vertical sectional elevation of a distributing valve taken along the line 13—13 of Fig. 14, the valve being adapted for use in the apparatus schematically shown in Figs. 1 to 3.
Figure 14:
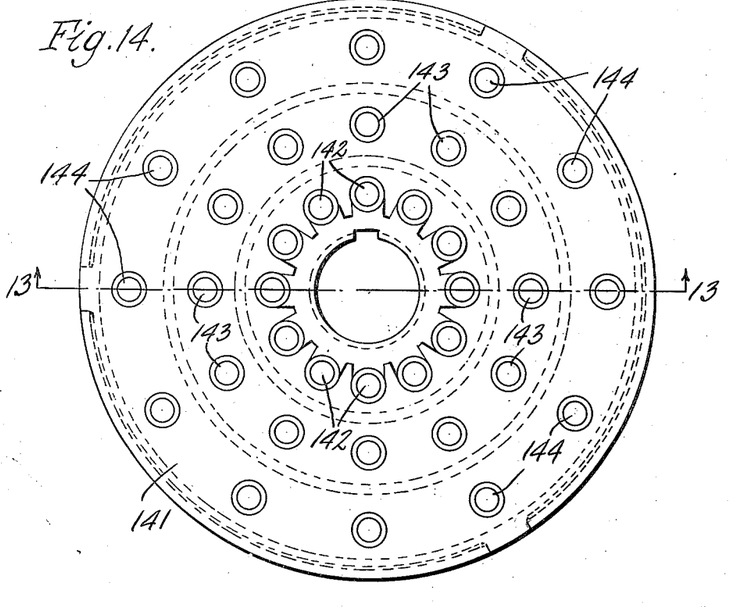
Fig. 14 is a plan view of the distributor shown in Fig. 13.

During the rotation of the shaft 98 it is important that the filtrate should not circulate from one filtration tank to the other. The circulation of the filtrate is interrupted at this time by reason of the lack of superposition of the passages of the movable plate and the passages of the fixed plate, which are therefore not in communication.

The hose 10, 40, 70, 12, 42 and 72 are removably connected to the passages of the distributor 11. Due to this removable connection, one can easily leave out certain filtration tanks or else change the order of using these filtration tanks. If, for example, one finds that the number of filtration tanks comprising the exterior ring of filtration tanks is not sufficiently large to properly complete the first treatment, and if besides one finds that two treatments in all will suffice, one can connect one of the outside ring with one of the filtration tanks of the adjacent ring and finish the first treatment in one of the filtration tanks of this last mentioned ring.

The last of the filtration tanks used in the first treatment is placed in communication with the first of the leaching tanks in which the second treatment is to begin. Upon leaving the last of the leaching tanks used in the second treatment, the pulp may be conveyed directly into one of the filtration tanks forming part of the second ring. The second treatment can be carried out in the filtration tanks of the inner ring.

One may also in a proper case cut down the number of tanks used for leaching by connecting the hose 10, 40, 70, 12, 42 and 72 to certain ones only of the passages in the distributor 11 and by causing the shaft 98 to turn each time through an angle determined by the number of tanks in service in each ring.

Thus, for example, if instead of using all the six filtration tanks of each ring as shown in Figs. 1 to 3, one wishes to use only three filtration tanks, one need only connect the hoses 10, 40, 70, 12, 42 and 72 to one passage out of four in each of the rings of passages, block the passages which are not used and choose suitable toothed wheels or gears 130 and 131 having relative diameters adapted to cause the shaft 98 to turn through an angle of 120 degrees at each rotation.

In a similar manner one might use but two diametrically opposed tanks in each ring.

It is noteworthy that the distributors shown in Figs. 13 and 14 would permit one to use twelve filtration tanks in each ring. It is only for the sake of simplicity that we have shown only six filtration tanks in each ring.

Assuming a distributor constructed in accordance with Figs. 13 and 14, by changing the connections of the hoses 10, 40, 70, 12, 42 and 72, and by changing the toothed wheels or gears 130 and 131, one might easily use either twelve or four or three or two filtration tanks in each ring.

If the material does not require three treatments, one might also use for each treatment necessary more than twelve tanks.

The presence of a filtering element in each of the filtration tanks appears in the preceding description as well as in the claims which follow. It should be understood that the expression "filter element" includes also a group of elements disposed in parallel in each tank as well as a single element such as has been shown in the drawings. In other words, the filter element may be single or multiple.

The filter elements herein used are well known in the art. A preferred type of element has walls and a closed bottom of stone or other similar porous material. The top of the element is preferably sealed, and has a passage there through to admit a hose or other suitable conduit connected to a source of vacuum.

It should also be noted that air lifts are common in the art, and the details thereof have not been considered necessary to this description; in fact some of the air lifts have not been designated in the drawings. It will be clear to anyone familiar with the art, however, that such air lifts may be disposed or arranged in any convenient manner without in any way interfering with the arrangement of the apparatus herein described.

I claim as my invention:

1. An improved method of leaching which comprises forming the pulp to be leached and while in finely divided form, into a porous object, moving said formed object along a prescribed path while its form remains unbroken, causing relative vertical movement of said object in succession into and then out of leaching baths at selected successive stages in said path, the last of said baths into which said object is lowered containing substantially only water, moving liquid of each bath into which said object is lowered at each stage, through said object by pressure differences, moving the liquid from bath to bath progressively in a direction opposite to movement of said object along said path, adding fresh solvent other than water to said bath at an intermediate stage in the movement of said object, using the liquid passed through said object in said first bath in said path to form additional pulp into a porous object for similar treatment, and collecting the liquid used to form each porous object, after such use, as a desired, concentrated solution.

2. The improved method of leaching which comprises suspending the solids of the material to be leached in a liquid medium, immersing in said medium a porous filter element having a hollow interior, applying suction to the hollow interior of said element to draw said medium therethrough to form on the exterior of said element an adherent coating of said solids, arranging leaching liquid for said solids in selected strengths in separate bodies, immersing the coated portion of said element in said bodies in succession, applying suction to the hollow interior of said element while so immersed in each body to draw leaching liquid of that body through said coating, then immersing the coated portion of said element in washing water while applying suction to the hollow interior of that element to wash from said adherent remaining coating any leaching liquid wetting the same, and then removing the remaining adherent coating from said element to prepare the element to receive a new coating of additional solids from said suspension.

3. The improved method of leaching which comprises suspending the solids of the material to be leached in a liquid medium, immersing in said medium a porous filter element having a hollow interior, applying suction to the hollow interior of said element to draw said medium therethrough to form on the exterior of said element an adherent coating of said solids, arranging leaching liquid for said solids in selected strengths in separate bodies, immersing the coated portion of said element in said bodies in succession, applying suction to the hollow interior of said element while so immersed in each body to draw leaching liquid of that body through said coating, then immersing the coated portion of said element in washing water while applying suction to the hollow interior of that element to wash from said adherent remaining coating any leaching liquid wetting the same, and then applying fluid pressure to the interior of said hollow element to dislodge said remaining adherent coating from said element and prepare the element to receive a new coating of additional solids from said suspension.

4. The improved method of leaching which comprises suspending the solids of the material to be leached in a liquid medium, immersing in said medium a porous filter element having a hollow interior, applying suction to the hollow interior of said element to draw said medium therethrough to form on the exterior of said element an adherent coating of said solids, arranging a leaching liquid for said solids in selected strengths in separate bodies, immersing the coated portion of said element in said bodies in succession, applying suction to the hollow interior of said element while so immersed in each body to draw leaching liquid of that body through said coating, then immersing the coated portion of said element in washing water while applying suction to the hollow interior of that element to wash from said adherent remaining coating any leaching liquid wetting the same, removing the remaining adherent coating from said element to prepare the element to receive a new coating of additional solids from said suspension, and treating said removed coating in a similar manner with a different leaching liquid to leach a different component from said material without contamination from the leaching liquid first used.

5. The improved method of leaching which comprises suspending the solids of the material to be leached in a liquid medium to form a suspension mixture, applying portions of said suspension mixture to faces of a plurality of porous elements in succession, moving said coated element in succession through a plurality of treating stations, drawing the liquid medium of said portion through said element to which it is applied to form on a face thereof a layer coating of the solids of said mixture, discharging said liquid medium so drawn through said element as a main product, retaining the coating on the element to which it is applied as that element moves in succession through said stations, discharging the coating from its element in the last of said stations in the sequence, passing water through said coating in the next to the last of said stations to remove from said coating thereon prior to discharge any leaching liquid adherent to the solids of that coating, passing the wash water that was passed through said coating and any leaching liquid removed with it through the coating of another of said elements while in an earlier station in said sequence to leach out a desired component of said solids, then adding a leaching liquid to the mixture of water and removed leaching liquid so obtained, passing that new mixture through the coating on an element that is in another still earlier station in said sequence to leach a further portion of said component from that coating, passing that liquid mixture last obtained through the coating on an element in a still earlier station in the sequence to leach a still further portion of said component from that coating, and using the mixture last obtained as the liquid suspension medium for making further suspension mixture.

6. An improved method of leaching solids with solvent solutions which comprises passing a mixture of solids and solution into an initial filtration tank, passing the liquid from said tank through the interior of a hollow filter element to cause said solids to adhere as a coating to said filter element, removing said element and adherent coating of solids from said tank and immersing them successively in a series of different filtration tanks containing solvent solutions first of progressively increasing solvent strength, and then of progressively decreasing solvent strength, passing solution from each of said tanks after the first tank in the series through said solids and filter element while immersed in that tank and delivering it into the next earlier tank in said series of filtration tanks, passing solution of said first tank in the series through the coating on said element while immersed therein, using this last mentioned solution with other solids to form additional mixtures of solids and solution for similar treatment in said same tanks, and discharging the solution obtained by forming said coating initially as a main product.

7. The improved method of leaching, which comprises suspending the solids of the material to be leached in a liquid medium, immersing to some extent in said medium a porous filter element having a hollow interior, applying suction to the hollow interior of said element to draw said medium therethrough to form on the exterior of said element an adherent coating of said solids, lowering said element with the same adherent coating while unbroken into separate selected bodies of leaching liquid of different strengths in succession, but elevating it out of one body of leaching liquid before lowering it into another body of leaching liquid and drawing liquid of each body through the coating of solids and said element while so lowered into each body of liquid to cause thorough leaching contact of said solid and liquid in a desired sequence.

8. The improved method of leaching, which comprises suspending the solids of the material to be leached in a liquid medium, immersing to some extent in said medium a porous filter element having a hollow interior, applying suction to the hollow interior of said element to draw said medium therethrough to form on the exterior of said element an adherent coating of said solids, arranging leaching liquid for said solids in selected strengths in separate bodies, immersing the coated portion of said element in said bodies in succession, applying suction to the hollow interior of said element while so immersed in each body to draw leaching liquid of that body through said coating, whereby said solids will be leached by a plurality of different leaching operations by leaching liquid of selected strengths.

9. Improved leaching apparatus of the type in which substantially solid matter is treated with a leaching liquid having at least two components, which comprises a plurality of mixing tanks disposed at approximately equally spaced intervals along a closed path, a plurality of filtration tanks disposed at approximately equal intervals along a closed path adjacent and similar to said first closed path and at a level generally above said mixing tanks, means for introducing solids and a leaching liquid into one of said mixing tanks and for conveying said solids and liquid successively through a selected series of said mixing tanks, means for discharging the mixture of solids and liquid from the last of said mixing tanks in said series into one of said filtration tanks, a filter element removably disposed in said one filtration tank, means for withdrawing said liquid from said one filtration tank through the filter element disposed therein, whereby solids from said mixture will be deposited upon and will adhere as a coating to said filter element, rotary and relatively vertically moving means for moving said filter element with the solids adhering thereto into each of a selected number of said filtration tanks adjacent one another in succession, and means for passing said liquid through said filter and adhering solids in each of said selected number of filtration tanks in succession and then passing it to said introducing means.

10. In leaching apparatus of the type in which solids to be leached are treated by passing a leaching solvent through solids adhering to a filter element, the improvement which comprises a plurality of filter elements, a plurality of filtration tanks in a series, one of said filter elements being removably disposed in each of said filtration tanks, means for feeding into the first tank in said series a mixture of solids and leaching solution, means for withdrawing said solution from said first tank through the filter element therein to cause said solids to coat and adhere to said element and discharging said solution from the apparatus as a main product, means for introducing a leaching solution into the second tank in said series, means for withdrawing said solution in said second tank through the filter therein and mixing the leaching solution so withdrawn with said solids to form said above mentioned mixture, means for introducing a leaching liquid into each of the subsequent tanks in said series, means for withdrawing the leaching liquid from each of said subsequent tanks in said series through the filter element disposed in each of said tanks and for delivering the fluid so withdrawn into each of the next earlier tanks in said series, means for supplying fresh, strong leaching liquid to the liquid admitted to one of said tanks intermediate of the series, means for moving each of said elements from tank to tank in said series in succession and for substantially immersing each of said elements in the liquid of each of said filtration tanks in which it is disposed at any time, whereby each element will be coated in said first tank and leaching solution passed through the coating of each element while in the other tanks in succession thereafter, and means for discharging the coating from each of said elements in turn after treatment in the last of said tanks in said series.

11. In leaching apparatus of the type in which solids to be leached are treated by passing a leaching solvent through solids adhering to a filter element, the improvement which comprises a plurality of filter elements, a plurality of filtration tanks in a series, one of said filter elements being removably disposed in each of said filtration tanks, means for feeding into the first tank in said series a mixture of solids and leaching solution, means for withdrawing said solution from said first tank through the filter element therein at any time to cause said solids to coat and adhere to said element and discharging said solution from the apparatus as a main product, means for delivering a leaching solution into the second tank in said series, means for withdrawing said solution into said second tank through the filter therein and mixing the leaching solution so withdrawn with said solids to form said above mentioned mixture, means for introducing a leaching liquid into each of the subsequent intermediate tanks in said series, means for withdrawing the leaching liquid from each of said subsequent tanks in said series through the filter element disposed in each of said tanks and for delivering the fluid so withdrawn into each of the next earlier tanks in said series, means for supplying water to the last of said tanks in said series, means for adding a relatively concentrated solvent to the liquid in one of said intermediate tanks in said series, means for moving each of said elements from tank to tank in said series in succession and for substantially immersing each of said elements in the liquid of each of said filtration tanks in which it is disposed at any time, whereby each element will be coated in the first tank, and leaching solution passed through the coating of each element while in the other tanks in succession thereafter, and means for discharging the coating from each of said elements in turn after treatment in the last of said tanks in said series.

12. Leaching apparatus of the type in which solids are treated by a leaching solvent which comprises a plurality of filter elements, means for moving each of said elements in turn through a series of stations in a closed cycle, means for coating each of said elements with solids to be leached in the first station in said series, means for passing leaching liquid through said elements and adherent coatings in each of said stations after said first station, means for progressively passing leaching liquid from each of said stations to the next preceding station in said series until said first station is reached, means for adding additional solids to be leached to said leaching liquid delivered to said first station, means for withdrawing leaching liquid from said first station as a final product, and means for adding relatively concentrated leaching solvent to said liquid in an intermediate station in said series.

13. Improved leaching apparatus comprising an upright shaft, means for reciprocating said shaft endwise and for also giving it uniform increments of rotation while at its upper end of its limited movement, with periods of rest at its lower limit of endwise movement, a plurality of filter tanks arranged in a row concentric about the axis of said shaft, a plurality of hollow filter elements, means carried by said shaft for suspending said elements above said tanks in positions to enter said tanks when said shaft is lowered, and to be lifted therefrom when said shaft is elevated, and to be shifted from above one tank to a position above another tank when said shaft is given said increments of rotation, a distributor having a relatively stationary part and a part rotated by said shaft, an individual conduit connecting the rotatable part of said distributor and the interior of each element, means for admitting to one of said tanks a mixture of solids to be leached and a suspending leaching liquid, means connected to said distributor for drawing through said element in said one tank at any time, liquid then in said tank and discharging it as a main product, thereby causing a deposit of solids on the surface of said element, means acting through said distributor for passing a leaching liquid from tank to tank in progression and outwardly through the filtering element in each tank at any time, until said one tank is reached, and means for adding additional solids to be leached to the liquid to be delivered to said one tank from an earlier tank in said progression.

14. Improved leaching apparatus comprising an upright shaft, means for reciprocating said shaft endwise and for also giving it increments of rotation while at its upper end of its limited movement, with periods of rest at its lower limit of endwise movement, a plurality of filter tanks arranged in a row concentric about the axis of said shaft, a plurality of hollow filter elements, means carried by said shaft for suspending said elements above said tanks in positions to enter said tanks when said shaft is lowered, and to be lifted therefrom when said shaft is elevated, and to be shifted from a position above one tank to a position above another tank when said shaft is given said increments of rotation, a distributor having a relatively stationary part and a part rotated by said shaft, an individual conduit connecting the rotatable part of said distributor and the interior of each element, means for admitting to one of said tanks a mixture of solids to be leached and a suspending leaching liquid, means connected to said distributor for drawing through said element in said one tank at any time liquid then in said tank and discharging it as a main product, thereby causing a deposit of solids on the surface of said element, means acting through said distributor for passing a leaching liquid from tank to tank in progression and outwardly through the filtering element in each tank at any time, until said one tank is reached, means for adding additional solids to be leached to the liquid to be delivered to said one tank from an earlier tank in said progression, and means for adding a solvent for a component of said solids at an intermediate point in said progression.

15. In a leaching apparatus, the combination of an upright shaft, means supporting said upright shaft for rotation and endwise movement, means for imparting repeated cycles of operation to said shaft including for each cycle an elevation of said shaft, then an increment of rotation, then a lowering of said shaft, and a quiet interval for said lowered shaft, a group of mixing tanks arranged about said shaft but in spaced relation thereto, a plurality of filter tanks supported upon the upper end of said group of tanks in a row concentrically about said shaft and opening upwardly, a plurality of hollow filter elements, means carried by the upper part of the shaft and suspending said elements therefrom to depend individually into said containers one after another in succession when said shaft is lowered and quiet, a distributor having a relatively stationary part and a part rotated by said shaft, a conduit connecting each element individually to the rotary part of said distributor, and means including conduits connected to the relatively stationary part of said distributor for individually drawing liquids from each tank through the filter element in that tank when said elements are within the tanks, means for delivering leaching liquid to one of said filter tanks, means connecting the filter elements and filter tanks and said conduits to pass the liquid from tank to tank in succession through said elements and distributor until the last filter tank in the succession is reached, means for delivering the liquid withdrawn from the filter element in said last tank as a final product, means for adding solids to the liquid transferred to the said last tank from the next earlier tank in said succession whereby the filter element then in said last tank will be coated with said solids by such withdrawal of liquid therethrough and the coating subjected to the action of leaching liquid in the other filter tanks while that coated element is in the other tanks in succession.

16. Improved leaching apparatus comprising a plurality of mixing tanks arranged in a circular row, means connecting said tanks and forming therewith a supporting unit, an upright shaft disposed concentrically with said unit, means for elevating and lowering said shaft and giving it increments of rotation when elevated, and periods of quiet when lowered, a plurality of pairs of tanks supported in a circular row on the upper end of said unit, each of said tanks having an inlet pipe and an outlet pipe with the outlet pipe connected to its lower end, a one-way check valve in each of said pipes, the valve in each inlet pipe passing fluid only toward that tank and the valve in the outlet pipe passing fluid only in a direction away from that tank, corresponding inlet pipes of each pair being connected together and the outlet pipes of each pair being connected together, a pair of pipe manifolds arranged approximately concentrically of said shaft and in proximity to said pairs of tanks, means for subjecting each of said manifolds alternately to suction and then to at least atmospheric pressure, means connecting one of said manifolds to one of said tanks, means connecting the other of said manifolds to the other of said tanks, a plurality of filter tanks also arranged concentrically about said shaft generally above said mixing tanks and opening upwardly, a plurality of hollow filter elements, means carried by the shaft for suspending said filter elements individually within said filter tanks when said shaft is lowered, and for lifting them therefrom when said shaft is raised, a distributor having a relatively stationary part and a part rotated with said shaft, connections between the interior of each element and the rotary part of said distributor, connections between the relatively stationary part of said distributor and the inlet pipes leading to each pair of vacuum tanks, pipes connecting the outlet pipes from each pair of vacuum tanks to a filter tank, means for delivering a leaching liquid to one of said filter tanks, the pipes connecting said filter tanks, distributor and vacuum tanks being connected for causing a circulation of the leaching liquid from filter tank to filter tank and through hollow filter elements therein in progression from said one filter tank until another filter tank is reached after a plurality of passages through filter tanks has occurred, the pair of vacuum tanks to which said last mentioned another filter element is connected being connected to discharge the liquid from that filter element as a final product, the pipes between the last mentioned another filter tank and the one next earlier in the progression having included in series therein a plurality of said mixing tanks, and means for adding solids to the liquid in said mixing tanks through which said leaching liquid flows.

17. Leaching apparatus comprising a frame, an upright shaft supported by said frame for endwise movement and for rotation, a plurality of leaching tanks arranged in a row concentrically about said shaft but spaced therefrom, a plurality of pulp thickener tanks disposed one above another along said shaft, with each thickener tank open at its top and having the shaft passing upwardly through the bottom of the tank, agitating means surrounding the shaft in each of said thickener tanks and rotated by the shaft, a plurality of filter tanks arranged in rows extending concentrically about said shaft and disposed at a level adjacent the top of said thickener tanks, a distributor disposed above the uppermost thickener tank, concentric with said shaft and splined to said shaft for rotation therewith, means connecting one group of said leaching tanks together in series one to another, another group of said leaching tanks in series to one another, whereby solids to be leached may be leached with one leaching liquid in one group and with a different leaching liquid in another group, a plurality of hollow filter elements, means carried by the upper part of said shaft for suspending said filter elements individually above said filter tanks, means for elevating said shaft, imparting thereto an increment of rotation equal to the distance between adjacent filter elements in the direction of rotation and then lowering it, repeatedly in cycles with a period of rest between cycles, whereby said filter elements will be lowered into said filter tanks successively, means for forming a coating of solids from one series of leaching tanks on a filter element while in one of said filter tanks, and drawing leaching liquid through said coating while that coated filter element is in other of said filter tanks, and means for forming a coating of solids from another series of leaching tanks on a filter element while in another of said filter tanks and drawing leaching liquid through said last named coating while that filter element is in still other of said filter tanks.

18. The improved method of progressive leaching to remove a desired component from a selected material, which comprises forming said material to be leached while in finely divided form into an adherent coating on a porous base, passing a leaching agent through said formed coating, while it remains unbroken, in a plurality of successive operations, using approximately pure water as the leaching agent for the last operation, and the passed liquid from each of the operations after the first as the agent for the next preceding operation, and using the passed liquid from said first operation as the liquid vehicle to form said coating of further material to be treated, and adding a fresh solvent for said component to the liquid passed through the coating at an intermediate one of said operations.

19. The improved method of progressive leaching to remove a desired component from a selected material, which comprises forming said material to be leached while in finely divided form into an adherent coating on a porous base, passing a leaching agent through said formed coating, while it remains unbroken and on said base, in a plurality of successive operations, using approximately all water as the leaching agent for the last operation, and the passed liquid from each of the operations after the first as the agent for the next preceding operation, and using the passed liquid from said first operation as the liquid vehicle to form said coating of further material to be treated by similar operations, adding a fresh solvent for said component to the liquid passed through the coating at an intermediate one of said operations, and passing a fluid in the opposite direction through said porous base after the operation with said water, to remove the coating from said base and thereby preparing the base to receive a fresh coating of material to be leached.

20. The improved method of progressive leaching to remove a desired component from a selected material, which comprises passing the material to be leached in finely divided form mixed with a leaching liquid containing a weak solvent through a series of leaching tanks in succession, then forming a coating of said finely divided material from the leaching tanks on a porous base by filtration of said mixture through said porous base, then passing a leaching agent through said formed coating, while it remains unbroken and on said base, in a plurality of successive operations, using approximately all water as the agent for the last of said operations in said succession, using the passed liquid from each of the operations after the first operation as the agent for the next preceding operation, using the passed liquid from said first operation as the leaching liquid admitted to said leaching tanks, and adding a fresh solvent for said component to the liquid passed through said coating at an intermediate one of said operations.

21. The improved method of progressive leaching to remove a desired component from a selected material, which comprises passing the material to be leached in finely divided form mixed with a leaching liquid containing a weak solvent through a series of leaching tanks in succession, then forming a coating of said finely divided material from the leaching tanks on a porous base by filtration of said mixture through said porous base, then passing a leaching agent through said formed coating, while said coating remains unbroken and on said base, in a plurality of successive operations, using approximately all water as the agent for the last of said operations in said succession, using the passed liquid from each of the operations after the first operation as the agent for the next preceding operation, using the passed liquid from said first operation as the leaching liquid admitted to said leaching tanks, adding a fresh solvent for said component to the liquid passed through said coating at an intermediate one of said operations, passing a fluid under pressure through said porous base in a direction opposite to that which caused the formation of the coating to remove the coating from said base after said last of said operations, and then coating the cleaned base with a new supply of said material to be leached.

LUCIEN CHARLES STURBELLE.